(12) United States Patent
Farina Vargas et al.

(10) Patent No.: US 10,000,080 B2
(45) Date of Patent: Jun. 19, 2018

(54) RANDOM WAVE MASK GENERATION

(71) Applicant: HEWLETT-PACKARD DEVELOPMENT COMPANY, L.P., Houston, TX (US)

(72) Inventors: Xavier Farina Vargas, Sant Cugat del Valles (ES); M. Isabel Borrell Bayona, Sant Cugat del Valles (ES); Angel Martinez Barambio, Sant Cugat del Valles (ES)

(73) Assignee: Hewlett-Packard Development Company, L.P., Houston, TX (US)

( * ) Notice: Subject to any disclaimer, the term of this patent is extended or adjusted under 35 U.S.C. 154(b) by 0 days. days.

(21) Appl. No.: 15/547,729

(22) PCT Filed: Apr. 17, 2015

(86) PCT No.: PCT/US2015/026328
§ 371 (c)(1),
(2) Date: Jul. 31, 2017

(87) PCT Pub. No.: WO2016/167790
PCT Pub. Date: Oct. 20, 2016

(65) Prior Publication Data
US 2018/0022128 A1    Jan. 25, 2018

(51) Int. Cl.
*B41J 2/045* (2006.01)
*B41J 2/21* (2006.01)
*B41J 29/393* (2006.01)
*G06K 15/10* (2006.01)
*B41J 29/38* (2006.01)

(52) U.S. Cl.
CPC ............ *B41J 29/38* (2013.01); *G06K 15/107* (2013.01)

(58) Field of Classification Search
CPC .... B41J 29/393; B41J 2/04556; B41J 2/2146; G06K 15/107
See application file for complete search history.

(56) References Cited

U.S. PATENT DOCUMENTS

| 5,450,099 A | 9/1995 | Stephenson et al. |
| 6,523,936 B2 | 2/2003 | Zapata et al. |
| 6,540,315 B1 | 4/2003 | Nystrom et al. |

(Continued)

FOREIGN PATENT DOCUMENTS

JP    2012061841    3/2012

OTHER PUBLICATIONS

Briggs; "Banding Characterization for Inkjet Printing"; IS&T's PICS 2000, Image Processing, Image Quality, Image Capture Systems Conference; Mar. 26-29, 2000; http://www.qua.com/upload/files/products/Paper_2000%20IS%26T-PICS%20Banding%20Characterization%20for%20IJ%20Printing.pdf.

*Primary Examiner* — Jason Uhlenhake
(74) *Attorney, Agent, or Firm* — HP Inc. Patent Department

(57) ABSTRACT

Example implementations relate to random wave mask generation. Some examples may distribute data points in a mask area based on a probability density function. The probability density function may have a maximum probability density located at a first edge and a second edge of the mask area. Some examples may also identify a wave curve that fits the data points. The wave curve may include oscillating waveforms of varying amplitudes. Some examples may also generate a random wave mask based on the wave curve.

15 Claims, 7 Drawing Sheets

(56) References Cited

U.S. PATENT DOCUMENTS

| | | | |
|---|---|---|---|
| 6,672,697 B2 * | 1/2004 | Haflinger | B41J 2/2135 347/12 |
| 7,434,911 B2 | 10/2008 | Brookmire et al. | |
| 2002/0149785 A1 | 10/2002 | Chu | |
| 2004/0046818 A1 | 3/2004 | Velde | |
| 2005/0046655 A1 | 3/2005 | Iannazzi | |
| 2009/0040550 A1 * | 2/2009 | Marumoto | G06K 15/105 358/1.15 |
| 2010/0013878 A1 * | 1/2010 | Spaulding | B41J 19/142 347/9 |
| 2012/0013674 A1 | 1/2012 | Garcia | |
| 2014/0009527 A1 | 1/2014 | Mongeon | |

* cited by examiner

FIG. 8

|  |  |  |  |  |  |  |  |  |  |  |
|---|---|---|---|---|---|---|---|---|---|---|
| 810a— | 1 | 1 | 1 | 1 | 1 | 1 | 1 | 1 | 1 | 1 |
| 810b— | 1 | 1 | 1 | 1 | 1 | 1 | 1 | 1 | 1 | 1 |
| 810c— | 1 | 1 | 1 | 1 | 1 | 1 | 1 | 1 | 1 | 1 |
| 810d— | 0 | 0 | 0 | 0 | 1 | 1 | 1 | 1 | 1 | 1 |
| 810e— | 0 | 0 | 0 | 0 | 0 | 1 | 1 | 1 | 1 | 1 |
| 810f— | 0 | 0 | 0 | 0 | 0 | 0 | 1 | 1 | 1 | 1 |
| 810g— | 0 | 0 | 0 | 0 | 0 | 0 | 0 | 1 | 1 | 1 |
| 810h— | 0 | 0 | 0 | 0 | 0 | 0 | 0 | 0 | 0 | 0 |

832

RANDOM WAVE MASK GENERATION

BACKGROUND

A printing device, such as a printer, multifunction printer, or the like, may include a number of printheads that are used to print content onto print media. In some printing devices, these printheads may be staggered such that a first set of droplet ejection elements (e.g., nozzles) in one printhead may overlap a second set of droplet ejection elements in another printhead. To determine how and when these overlapping droplet ejection elements fire, a mask may be used. The mask may define the particular pattern of droplet ejection elements that will be fired during printing.

BRIEF DESCRIPTION OF THE DRAWINGS

The following detailed description references the drawings, wherein:

FIG. 8 illustrates an example of a portion of a random wave mask consistent with disclosed implementations.

DETAILED DESCRIPTION

Figure 1:
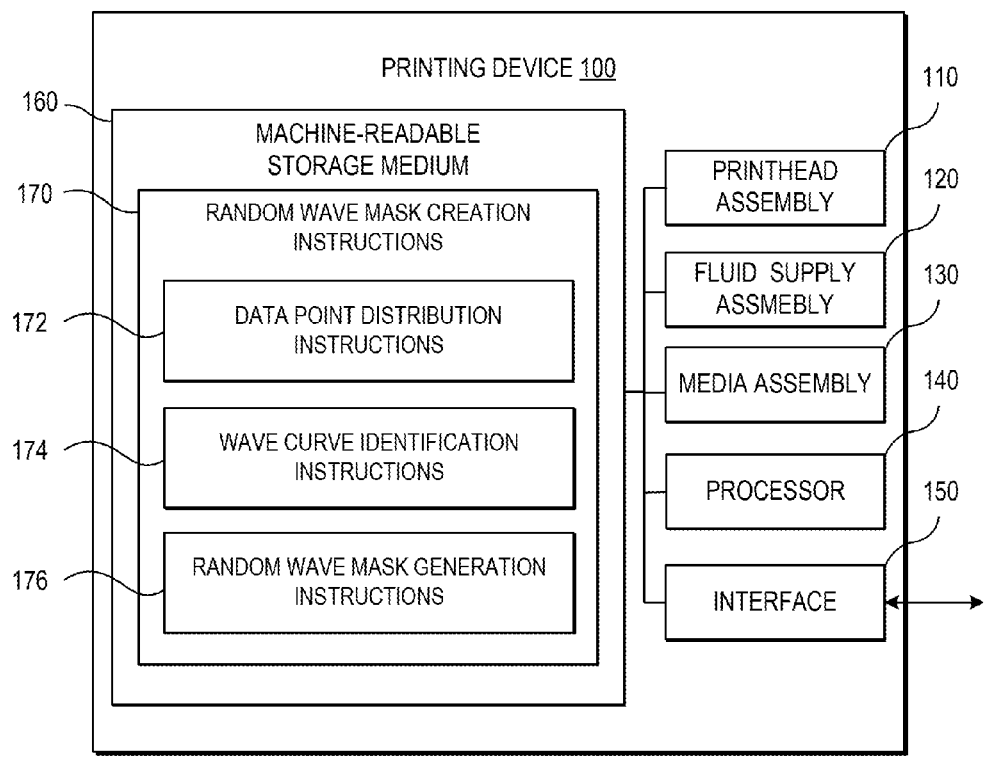
FIG. 1 is a block diagram of an example printing device consistent with disclosed implementations.

The following detailed description refers to the accompanying drawings. Wherever possible, the same reference numbers are used in the drawings and the following description to refer to the same or similar parts. While several examples are described in this document, modifications, adaptations, and other implementations are possible. Accordingly, the following detailed description does not limit the disclosed examples. Instead, the proper scope of the disclosed examples may be defined by the appended claims.

As detailed above, some printing devices may include a number of staggered printheads that include overlapping droplet ejection elements. One example of such a printing device is a Page Wide Array ("PWA") printer. Unlike some conventional printers, PWA printers may not include a moving carriage. Instead, there may be a bar of printhead dies covering the width of the print media and oriented orthogonally to the print media path. Printhead assemblies in this bar may include overlapping dies, and the bar itself may include thousands of droplet ejection elements which eject drops of printing fluid as the print media moves under the bar in a substantially perpendicular direction. Since PWA printers may include thousands of nozzles dispersed on multiple overlapping PWA printhead dies, the ejection of printing fluid from those printhead dies may be controlled by a mask. In one example, masks may use a sharp linear pattern to differentiate between overlapping droplet ejection elements. These sharp linear masks, however, may create image quality defects in the presence of crossweb (e.g., perpendicular to print media movement) alignment errors. For example, the linear masks may create a vertical line corresponding to transitions between printheads that is easily detectable by the human eye. Other stitching masks may use regular sinusoidal patterns, but due to the regularity of the pattern, the image quality defect may still be visible. Accordingly, a need exists to reduce the visibility of image quality defects.

Examples disclosed herein may reduce the visibility of image quality defects. To this end, example implementations disclosed herein may provide random wave mask generation by distributing data points in a mask area based on a probability density function. For example, the data points may be distributed based on a probability density function (e.g., an inverted normal distribution) that has a maximum probability density located at the edges (e.g., a first edge and a second edge) of the mask area. Some implementations may also identify a wave curve (e.g. a curve including oscillating waveforms of varying amplitudes) that fits the data points, and generate a random wave mask based on the wave curve.

Referring now to the drawings, FIG. 1 is a block diagram of an example printing device 100 consistent with disclosed implementations. Printing device 100 may be implemented in various ways. For example, printing device 100 may be a PWA printer, an inkjet printer, a computing system, and/or any other type of system that can produce content (e.g. images, text, etc.) on print media. In the example shown in FIG. 1, printing device 100 may include a printhead assembly 110, a fluid supply assembly 120, a media assembly 130, a processor 140, an interface 150, and a machine-readable storage medium 160.

Printhead assembly 110 may be any device capable of ejecting drops of printing fluid toward print media. For example, printhead assembly 110 may include at least one printhead die which ejects drops of printing fluid through droplet ejection elements (e.g., orifices, nozzles, and/or the like) onto print media to produce print content (e.g., a printed image). Print media consistent with disclosed examples may be any suitable material for printing, such as paper, cardstock, transparencies, textiles, mesh, and the like. Typically, the nozzles may be arranged in at least one column or array such that properly sequenced ejection of printing fluid from the nozzles may cause characters, symbols, and/or other graphics or images to be printed upon print media as the print media is moved relative to printhead assembly 110. An example of printhead assembly 110 consistent with disclosed implementations is discussed in more detail below with respect to, for example, FIG. 2.

Fluid supply assembly 120 may be any device capable of supplying printing fluid to a component of printing device 100. For example, printing fluid supply assembly 120 may be a component or collection of components that supplies printing fluid, such as ink, to printhead assembly 110. In some implementations, fluid supply assembly 120 may include a removable, replaceable, and/or refillable reservoir for storing printing fluid. Printing fluid may flow from the reservoir to printhead assembly 110. In some implementations, printhead assembly 110 and printing fluid supply assembly 120 may be housed together to form a cartridge or pen. In some implementations, printing fluid supply assembly 120 may be separate from printhead assembly 110 and may supply printing fluid to printhead assembly 110 through an interface connection, such as a supply tube.

Media assembly 130 may be any component or collection of components that transports print media relative to printhead assembly 110. For example, media assembly 130 may function to advance or position print media relative to printhead assembly 110, such as by advancing or positioning the print media in a direction orthogonal (e.g., perfectly orthogonal and/or substantially orthogonal) to printhead assembly 110.

Processor 140 may be at least one processing unit (CPU), microprocessor, and/or another hardware device to execute instructions to perform operations. For example, processor 140 may fetch, decode, and execute random wave mask identification instructions 170 (e.g., instructions 172, 174, and/or 176) stored in machine-readable storage medium 160 to perform operations related to disclosed examples.

Interface device 150 may be any device that facilitates the transfer of information between printing device 100 and external components, such as another printing device, a scanner, a desktop computer, a laptop computer, a tablet computing device, a mobile phone, a server, and/or any other suitable type of system. In some examples, interface device 150 may include a network interface device that allows printing device 100 to receive and send data to and from a network. For example, interface device 150 may retrieve and process data related to an image to be printed by printing device 100 from a remote computing system.

Machine-readable storage medium 160 may be any electronic, magnetic, optical, or other physical storage device that stores executable instructions. Thus, machine-readable storage medium 160 may be, for example, memory, a storage drive, an optical disc, and the like. In some implementations, machine-readable storage medium 160 may be a non-transitory machine-readable storage medium, where the term "non-transitory" does not encompass transitory propagating signals. Machine-readable storage medium 160 may be encoded with instructions that, when executed by processor 140, perform operations consistent with disclosed implementations. For example, machine-readable storage medium 160 may include random wave mask creation instructions 170 that, when executed by processor 140, perform operations that may generate a random wave mask. In the example shown in FIG. 1, machine-readable storage medium 160 may include data point distribution instructions 172, wave curve identification instructions 174, and random wave mask generation instructions 176.

Data point distribution instructions 172 may function to distribute data points in a mask area based on a probability density function. For example, when data point distribution instructions 172 are executed by a processor, such as processor 140 of printing device 100, data point distribution instructions 172 may cause processor 140 and/or another processor to distribute data points in a mask area based on a probability density function. In some implementations, the probability density function may have a maximum probability density located at a first edge and a second edge of the mask area. Examples of processes performed to distribute data points in a mask area are described in further detail below with respect to, for example, FIGS. 3, 4, 5, and 7.

Wave curve identification instructions 174 may function to identify a wave curve that fits the data points. For example, when wave curve identification instructions 174 are executed by a processor, such as processor 140 of printing device 100, wave curve identification instructions 174 may cause the processor to identify a wave curve that fits the data points, such as a wave curve that includes oscillating waveforms of varying amplitudes. For example, wave curve identification instructions 174, when executed, may identify the wave curve that fits the data points by fitting a smooth curve that approximates the data points to generate the oscillating waveforms. Examples of processes performed to identify a wave curve that fits the data points are described in further detail below with respect to, for example, FIGS. 3, 4, and 7.

Random wave mask generation instructions 176 may function to generate a random wave mask based on the wave curve. For example, when random wave mask generation instructions 176 are executed by a processor, such as processor 140 of printing device 100, random wave mask generation instructions 176 may cause processor 140 and/or another processor to generate a mask by dividing a mask area into a first mask area and a second mask area, the mask area being divided based on the wave curve, assigning an indicator to cells in the mask area based on whether the cell is in the first mask area or the second mask area, identifying tapering cells, determining whether to modify the assignment of the indicators of at least one of the tapering cells, and modifying (or in some instances not modifying) the assignment of the indicators based on the determination. Examples of processes performed to generate a random wave mask based on the wave curve are described in further detail below with respect to, for example, FIGS. 3, 4, 6, 7, and 8.

The arrangement illustrated in FIG. 1 is simply an example, and printing device 100 may be implemented in a number of different configurations. For example, while FIG. 1 shows one printhead assembly 110, fluid supply assembly 120, media assembly 130, processor 140, interface 150, and machine-readable storage medium 160, printing device 100 may include any number of components 110, 120, 130, 140, 150, and 160 as well as other components not depicted in FIG. 1. For example, printing device 100 may omit any of components 110, 120, 130, 140, 150, and 160 and/or combine at least one of components 110, 120, 130, 140, 150, and 160 (e.g., printhead assembly 110 and fluid supply assembly 120 may be housed together). As another example, while FIG. 1 shows that each of components 110, 120, 130, 140, 150, and 160 are communicatively connected, at least one of components, 110, 120 130, 140, 150, and 160 may not be communicatively connected to other components of printing device 100 or to external components. As yet another example, while FIG. 1 shows that each of components 110, 120, 130, 140, 150, and 160 are internal to printing device 100, at least one of components 110, 120, 130, 140, 150, and 160 may be external to printing device 100. For example, machine-readable storage medium 160 including processing instructions 170 may be located in a computing system external to printing device 100.

Figure 2:
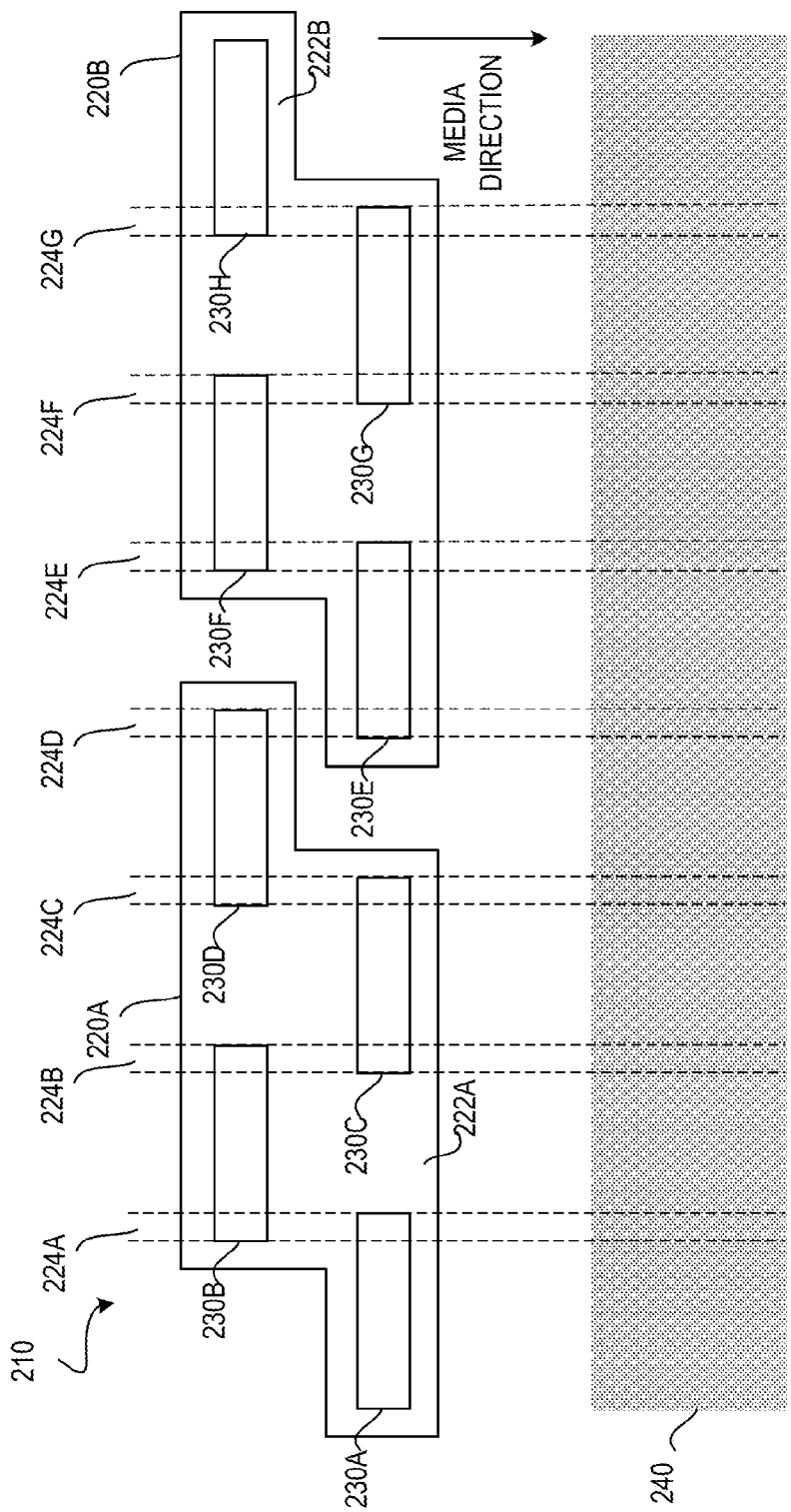
FIG. 2 is a top view of an example of a printhead assembly printing an image consistent with disclosed implementations.

FIG. 2 is a top view of an example of a printhead assembly 210 printing an image 240 consistent with disclosed implementations. In certain aspects, printhead assembly 210 may correspond to printhead assembly 110 of FIG. 1. For example, printhead assembly 210 may perform functions similar to those describe above with respect to printhead assembly 110 of FIG. 1 and/or may be incorporated as part of printing device 100 of FIG. 1. Although printhead assembly 210 may be described below with reference to printing device 100 of FIG. 1 and/or specific components of printing device 100, other suitable systems and devices may be used with printhead assembly 210.

As shown in FIG. 2, printhead assembly 210 may be a wide-array or multi-head printhead assembly including a plurality of modules 220 (220A and 220B). At least one of modules 220 may include at least one printhead die 230 (230A, 230B, 230C, 230D, 230E, 230F, 230G, 230H). For example, each module 220 may include a plurality of printhead dies 230 and may function to carry the dies 230 and provide electrical and fluidic communication between printhead dies 230, a printing fluid supply assembly (such as fluid supply assembly 120 discussed above with respect to FIG. 1), and/or an electronic controller (such as processor 140 and machine-readable storage medium 160 discussed above with respect to FIG. 1).

Dies 230 may be mounted on a face 222 (222A, 222B) of module 220 (220A, 220B) and aligned in at least one row. In some implementations, printhead dies 230 may include at least one array of droplet ejection elements, such as nozzles. In some implementations, at least one droplet ejection element of a particular printhead die may overlap (e.g., be redundant to) another droplet ejection element of another printhead die. That is, in some examples, a droplet ejection element of a particular die may share a printing axis (i.e., an axis extending in a direction substantially parallel to the advancing direction of the print media during printing) with another nozzle of another printhead die such that target pixels corresponding to the printing axis are capable of being printed by either printhead die. For example, printhead die 230A may include a first set of droplet ejection elements that overlap a second set of droplet ejection elements of printhead die 230B such that the first set and the second set of droplet ejection elements are capable of ejecting drops on the same area of a print media (e.g., on overlap area 224A).

In some implementations, printhead dies 230 may be arranged in at least one overlapping row. For example, printhead dies 230 may be arranged in a first row and a second row that is spaced from and oriented substantially parallel to the first row. Additionally, printhead dies 230 in the first row may be offset from printhead dies in 230 in the second row such that each printhead die 230 in the first row of a module 220 overlaps at least one printhead die 230 in the second row with respect to a direction substantially perpendicular to the printing axis. As a result, the print swath of each printhead die 230 may overlap with at least one adjacent printhead die in the same module 220 or in different modules 220A and 220B.

Portions of print media corresponding to an overlap of two printhead dies 230 may be considered to be overlap areas 224A, 224B, 224C, 224D, 224E, 224F, 224G. Printing device 100 may instruct particular nozzles in printhead dies 230 to print in the overlap areas 224 using a random wave mask. For example, printing device 100 may apply at least one random wave mask such that printhead die 230A may print a portion of the target pixels in overlap area 224A and printhead die 230B may print another portion of the target pixels in overlap area 224A. The random wave mask may compensate for image quality errors caused by overlapping droplet ejection elements. Accordingly, in some examples the random wave mask may include a pattern generated based on the use of a randomizing factor. Accordingly, when processor 140 of printing device 100 executes random wave mask identification instructions 170, the image quality error caused by overlapping droplet ejection elements may be less visible to a user viewing the printed image. For example, the pattern or patterns ultimately printed on the areas of print media 240 corresponding to the overlap areas 224A through 224G may include oscillating waveforms of varying amplitudes as described in further detail below.

It is to be understood that FIG. 2 is a simplified schematic illustration of printhead assembly 210, and that printhead assemblies consistent with disclosed implementations may include any number of modules, dies, and the like. Furthermore, modules and dies consistent with the disclosed examples may be of any suitable size, shape, and arrangement.

Figure 3:
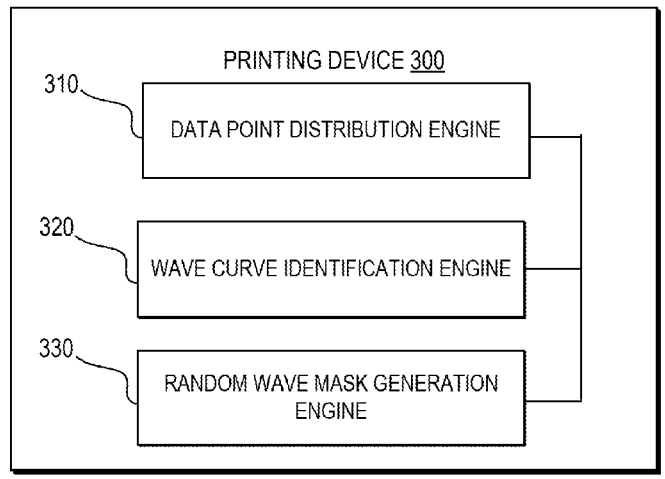
FIG. 3 is a block diagram of an example printing device consistent with disclosed implementations.

FIG. 3 is a block diagram of an example printing device 300 consistent with disclosed implementations. In certain aspects, printing device 300 may correspond to printing device 100 of FIG. 1. Printing device 300 may be implemented in various ways. For example, printing device 300 may be a printer, a special purpose computer, a server, a mainframe computer, a computing device executing instructions that receive and process information and provide responses, and/or any other type of computing system. In the example shown in FIG. 3, printing device 300 may include a data point distribution engine 310, a wave curve identification engine 320, and a random wave mask generation engine 330.

Engines 310, 320, and 330 may be electronic circuitry for implementing functionality consistent with disclosed examples. For example, engines 310, 320, and 330 may represent combinations of hardware devices and programming to implement functionality consistent with disclosed implementations. For example, the programming for the engines may be processor-executable instructions stored on a non-transitory machine-readable storage medium and the hardware for the engines may include a processor (i.e., at least one processor) to execute those instructions. In some examples, the functionality of engines 310, 320, and 330 may correspond to operations performed by printing device 100 of FIG. 1, such as operations performed when random wave mask identification instructions 170 are executed by processor 140. In FIG. 3, data point distribution engine 310 may represent a combination of hardware and programming that performs operations similar to those performed when processor 140 executes data point distribution instructions 172. Similarly, wave curve identification engine 320 may represent a combination of hardware and programming that performs operations similar to those performed when processor 140 executes wave curve identification instructions 174, and random wave mask generation engine 330 may represent a combination of hardware and programming that performs operations similar to those performed when processor 140 executes random wave mask generation instructions 176.

Figure 4:
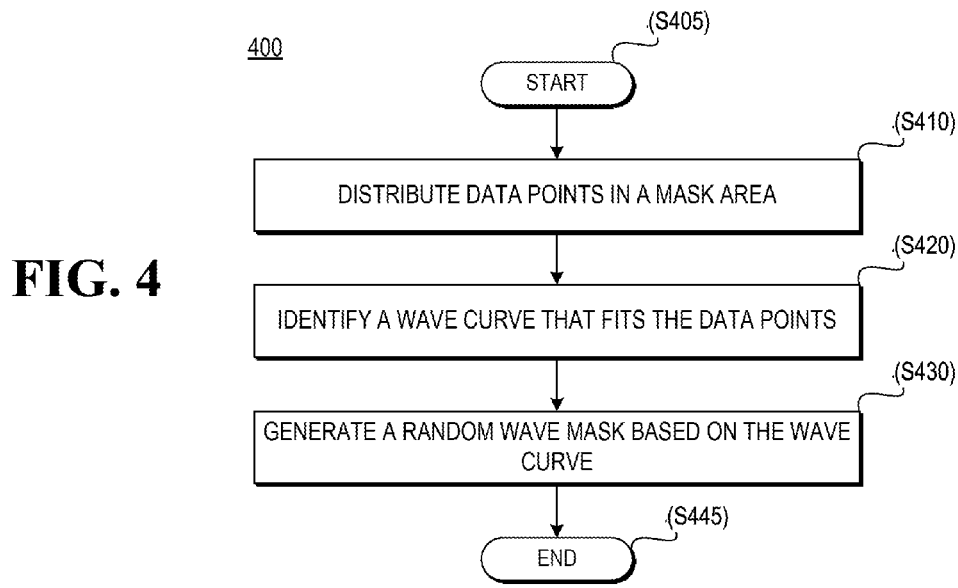
FIG. 4 is a flow chart of an example process for random wave mask generation consistent with disclosed implementations.

FIG. 4 is a flow chart of an example process 400 for random wave mask generation consistent with disclosed implementations. Although execution of process 400 is described below with reference to printing device 100 of FIG. 1 and/or specific components of printing device 100, other suitable systems and devices for execution of at least one step of process 400 may be used. For example, processes described below as being performed by printing device 100 may be performed by printing device 300 and/or any other suitable device. Process 400 may be implemented in the form of executable instructions stored on a storage device, such as a machine-readable storage medium, and/or in the form of electronic circuitry.

Process 400 may start (step S405) before an image is printed on print media. For example, process 400 may start when printing device 100 receives or otherwise accesses instructions to print content on print media. Once printing device 100 receives or otherwise accesses the instructions, printing device 100 may distribute data points in a mask area (step S410). For example, printing device 100 may distribute data points in a mask area by identifying the dimensions of the mask area, identifying a first axis range for each of the data points along a first axis of the mask area, and/or identifying a set of mask area coordinates (e.g., a pair a numerical coordinates) for each of the data points. The set of mask area coordinates (e.g., the location of a particular data point with respect to the first axis and a second axis) may function to allow printing device 100 to identify each data point uniquely in the mask area. In some implementations, the data points may be randomly distributed in the mask area. For example, data points may be distributed based on (e.g., by applying) a probability density function (e.g., a function that describes the relative likelihood for the data point to be positioned at a particular location) that has a maximum probability density located at edges of the mask area (e.g., at a first edge and a second edge of the mask area). Thus, in some implementations, the data points may have a higher probability of being positioned near the mask area edges. For example, the probability density function may be applied based on the first axis position. Examples of the steps that may be involved with distributing data points in a mask area are discussed in greater detail below with respect to, for example, FIGS. 5, 7, and 9.

Process 400 may also include identifying a wave curve that fits the data points (step S420). In some implementations, printing device 100 may identify a wave curve that includes oscillating waveforms of varying amplitudes. For example, printing device 100 may fit a smooth curve that approximates the data points to generate the oscillating waveforms. The smooth curve may be generated such that it has a substantial number of smooth peaks and troughs, the waveforms have moderate frequency, and/or the waveforms pass through or near each of the data points. In some implementations, the curve may be fit based on a polynomial function. For example, the curve may be fit by creating a fifth degree b-spline based on the data points. Examples of the steps that may be involved with identifying a wave curve that fits the data points are discussed in greater detail below with respect to, for example, FIGS. 7 and 9.

Process 400 may also include generating a random wave mask based on the wave curve (step S430). In some implementations, the random wave mask may include a plurality of cells. For example, printing device 100 may generate the random wave mask by dividing the mask area into a plurality of cells, where each cell may correspond to a coordinate pair within the mask area. For example, the mask area may be divided into a number of smaller rectangles and/or squares, and each smaller rectangle and/or square may be considered to be a cell. In some implementations, printing device 100 may also generate the random wave mask by assigning an indicator to each of the plurality of cells based on whether the cell is located on one side of the wave curve or the other side of the wave curve. For example, the wave curve may divide the mask area into a first mask area and a second mask area, and printing device 100 may assign an indicator (e.g., one of a first indicator and a second indicator) to each cell. A first indicator may be assigned to cells of the plurality of cells that correspond to the first mask area, while a second indicator may be assigned to cells of the plurality of cells that correspond to the second mask area. The indicator may identify which set of droplet ejection elements will fire to print content onto print media, and may be at least one number, letter, symbol, and/or any other type of character or information that identifies which set of droplet ejection elements will be fired to print the content on the print media in, for example, an overlap area. For example, the first indicator may indicate that a first set of droplet ejection elements will fire to print content on print media, while the second indicator may indicate that a second set of droplet ejection elements will fire to print content on the print media. In some implementations, after the indicator is assigned, the indicator of some cells (e.g., cells close and/or adjacent to the wave curve) may be modified based on a second probability density function. After at least one of steps S410 through S430 have been performed, process 400 may end (step S445). Examples of the steps that may be involved with generating a random wave mask based on a wave curve are discussed in greater detail below with respect to, for example, FIGS. 6-9.

Figure 5:
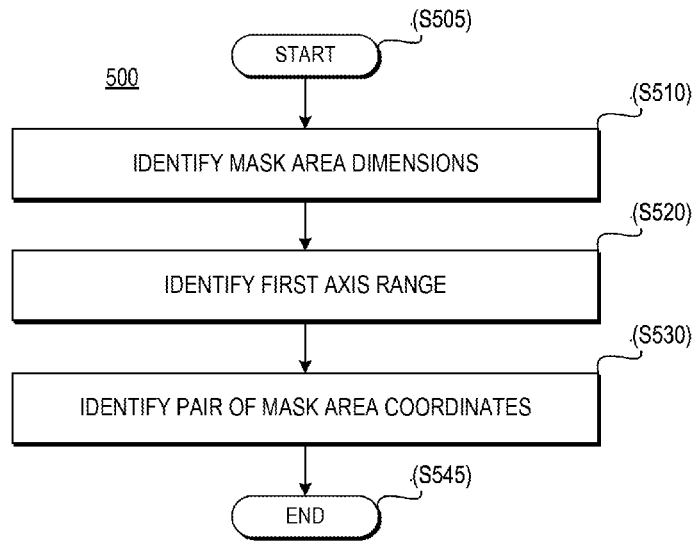
FIG. 5 is a flow chart of an example process for distributing data points in a mask area consistent with disclosed implementations.

FIG. 5 is a flow chart of an example process 500 for distributing data points in a mask area consistent with disclosed implementations. Although execution of process 500 is described below with reference to printing device 100 of FIG. 1 and/or specific components of printing device 100, other suitable systems and devices for execution of at least one step of process 500 may be used. For example, processes described below as being performed by printing device 100 may be performed by printing device 300 and/or any other suitable device. Process 500 may be implemented in the form of executable instructions stored on a storage device, such as a machine-readable storage medium, and/or in the form of electronic circuitry.

Once process 500 starts (step S505), process 500 may include identifying the dimensions of the mask area (step S510). In some implementations, printing device 100 may identify the dimensions of the mask area based on predetermined random wave mask lengths and widths. For example, the mask area may correspond with or be otherwise equal to the random wave mask to be generated by a mask generation engine, such as random wave mask generation engine 330. In some implementations, the mask area length and/or width may be determined to be the longest and/or widest possible to increase the randomness of the distribution of the data points. This may, in some examples, reduce a number of times that the pattern generated by the random wave mask will be repeated.

Process 500 may also include identifying a first axis range for each of the data points along a first axis of the mask area (step S520). In some implementations, the first axis range may be identified by dividing the mask area into a plurality of function areas. For example, printing device 100 may divide the mask into a plurality of function areas, such as by dividing the mask area along the first edge into a plurality of function areas based on a first edge interval. The first edge interval may be a predetermined number, or may be based on the length of the first edge. For example, printing device 100 may define the first edge interval by dividing the length of the first edge by a number of data points (e.g., a predetermined number) to be plotted in the mask area.

Process 500 may also include identifying a set of mask area coordinates (step S530) for each of the data points. In some implementations, the set of mask area coordinates may be identified by generating and/or applying at least one probability density function. For example, printing device 100 may generate a probability density function for each of the function areas and distribute at least one data point in each of the function areas based on the at least one data point's associated probability density function. Thus, in some implementations, each of the probability density functions may be associated with at least one of the function areas. In some implementations, the probability density functions may have a maximum probability density located adjacent to edges of the mask area (e.g., adjacent to a first edge and a second edge of the mask area). Thus, within each function area each data point has a higher probability of being placed near the edges of the mask area (e.g., the edges of the mask area that that are substantially parallel to the printing direction) as opposed to the middle of the mask area.

In some implementations, the distribution of the data points based on the area's probability density function may be limited to distribution along a single axis. For example, the first axis position of a data point may be based on a length of the first edge and a first axis interval (e.g. a predetermined first axis interval) between each of the data points. Thus, in some examples, one of the coordinates of the mask area coordinates may be a predetermined number (e.g., a number based on a predetermined interval between points) while another of the coordinates may be selected based on the probability density function. After at least one of steps S510, S520, and S530 have been performed, process 500 may end (step S545). Examples of the steps that may be involved with dividing the mask area into a plurality of function areas, identifying a first axis range, and/or identifying a set of mask area coordinates are discussed in greater detail below with respect to, for example, FIG. 7

Figure 6:
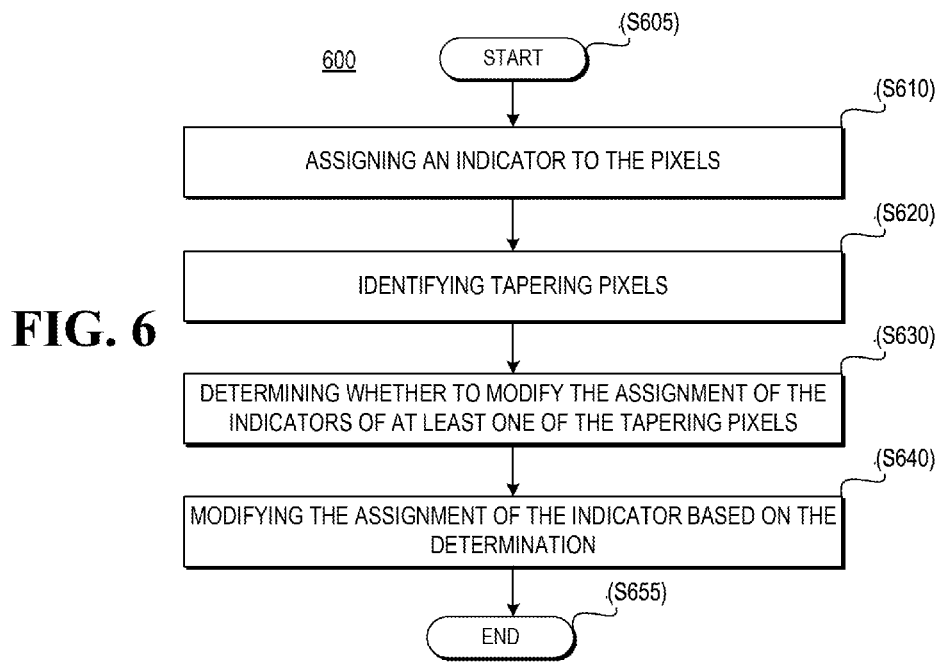
FIG. 6 is a flow chart of an example process for generating a random wave mask consistent with disclosed implementations.

FIG. 6 is a flow chart of an example process 600 for generating a random wave mask consistent with disclosed implementations. Although execution of process 600 is described below with reference to printing device 100 of FIG. 1 and/or specific components of printing device 100, other suitable systems and devices for execution of at least one step of process 600 may be used. For example, processes described below as being performed by printing device 100 may be performed by printing device 300 and/or any other suitable device. Process 600 may be implemented in the form of executable instructions stored on a storage device, such as a machine-readable storage medium, and/or in the form of electronic circuitry.

Process 600 may start (S605) after the wave curve has been identified. For example, as discussed above, the wave curve may divide the mask area into two areas (e.g., a first mask area and a second mask area). The portion of the mask area on one side of the curve may be considered to be the first mask area and the portion of the mask area on the other side of the curve may be considered to be the second mask area. As discussed above, the mask area may include a plurality of cells, and thus some cells may be considered to be part of the first mask area while other cells may be considered to be part of the second mask area. In some implementations, each cell in the mask area (whether in the first mask area or the second mask area) may be defined such that it corresponds to a target pixel in the overlap area of the print media and/or a droplet ejection element.

Process 600 may include assigning an indicator to each of the plurality of cells (step S610). In some implementations (and as discussed above) the indicator may be one of a first indicator and a second indicator and may identify which set of droplet ejection elements will fire to print content onto print media, and may be at least one number, letter, symbol, and/or any other type of character or information that identifies which set of droplet ejection elements will be fired to print the content on the print media. For example, the indicator may identify whether a first set of droplet ejection elements or a second set of droplet ejection elements will fire for a particular target pixel in the overlap area of the print media. For example, the first indicator may indicate that a first set of droplet ejection elements will fire to print content on print media, while the second indicator may indicate that a second set of droplet ejection elements will fire to print content on the print media.

Process 600 may include identifying tapering cells (step S620) based on proximity to the wave curve. In some implementations, identifying tapering cells may include identifying a number of cells (e.g., tapering cells) that are adjacent to the wave curve (e.g., a smooth curve). For example, the tapering cells adjacent to the wave curve (e.g., the smooth curve) may comprise a predetermined number of cells adjacent to the wave curve (e.g., the smooth curve). Printing device 100 may determine that cells including the wave curve (e.g., the smooth curve) and/or a certain number of cells on either side of the wave curve (e.g., the smooth curve) may constitute tapering cells. In some implementations, there may be an equal number of tapering cells in the first mask area and the second mask area. For example, and as shown in FIG. 8, the mask area of cells may include rows and columns of cells. In some implementations, for each cell including the random wave curve, printing device 100 may select a number (e.g., 1, 2, 3, 4, etc.) of cells in the mask area that are in the same column as and on either side of the particular cells. For example, printing device 100 may identify three cells directly above the particular cell and three cells directly below the particular cell as tapering pixels.

Process 600 may include determining whether to modify the assignment of the indicators of at least one of the tapering cells (step S630) based on a second probability density function. For example, the probability density function discussed above may be a first probability density function. In some examples, the second probability density function may differ from the first probability density function. For example, the second probability density function may have a maximum probability density for cells closest to the wave curve. In some implementations, the second probability density function may have a decreasing probability density moving away from the random wave curve. Thus, in some examples, the closer the tapering cell is to the wave curve, the higher the probability of switching the initial assignment. For example, tapering cells in the same column as and closest to a cell including the wave curve may have a 90% probability of having the assignment of their associated indicators modified, while tapering cells in the same column that are farthest from the cell including the wave curve may have a 10% probability of having their indicator assignment modified. Thus, in some examples, the random wave mask may be generated by determining whether to switch the initial assignment of at least one of the tapering cells from a first set of droplet ejection elements to a second set of droplet ejection elements. Additionally, in some examples, the determination may be based on a proximity of the tapering cell to the wave curve (e.g., the smooth curve). In some implementations, by modifying the assignment of the tapering cells, the boundaries between the content printed by the first set of droplet ejection elements and the second set of droplet ejection elements can be made less clear and/or otherwise fuzzied. An example of these fuzzied boundaries may be seen in greater detail in FIG. 7. Once printing device 100 has determined which, if any, of the tapering cells to modify, process 600 may also include modifying the assignment of the indicators based on the determination (step S640). After at least one of steps S610, S620, S630, and S640 have been performed, process 600 may end (step S655).

Figure 7:
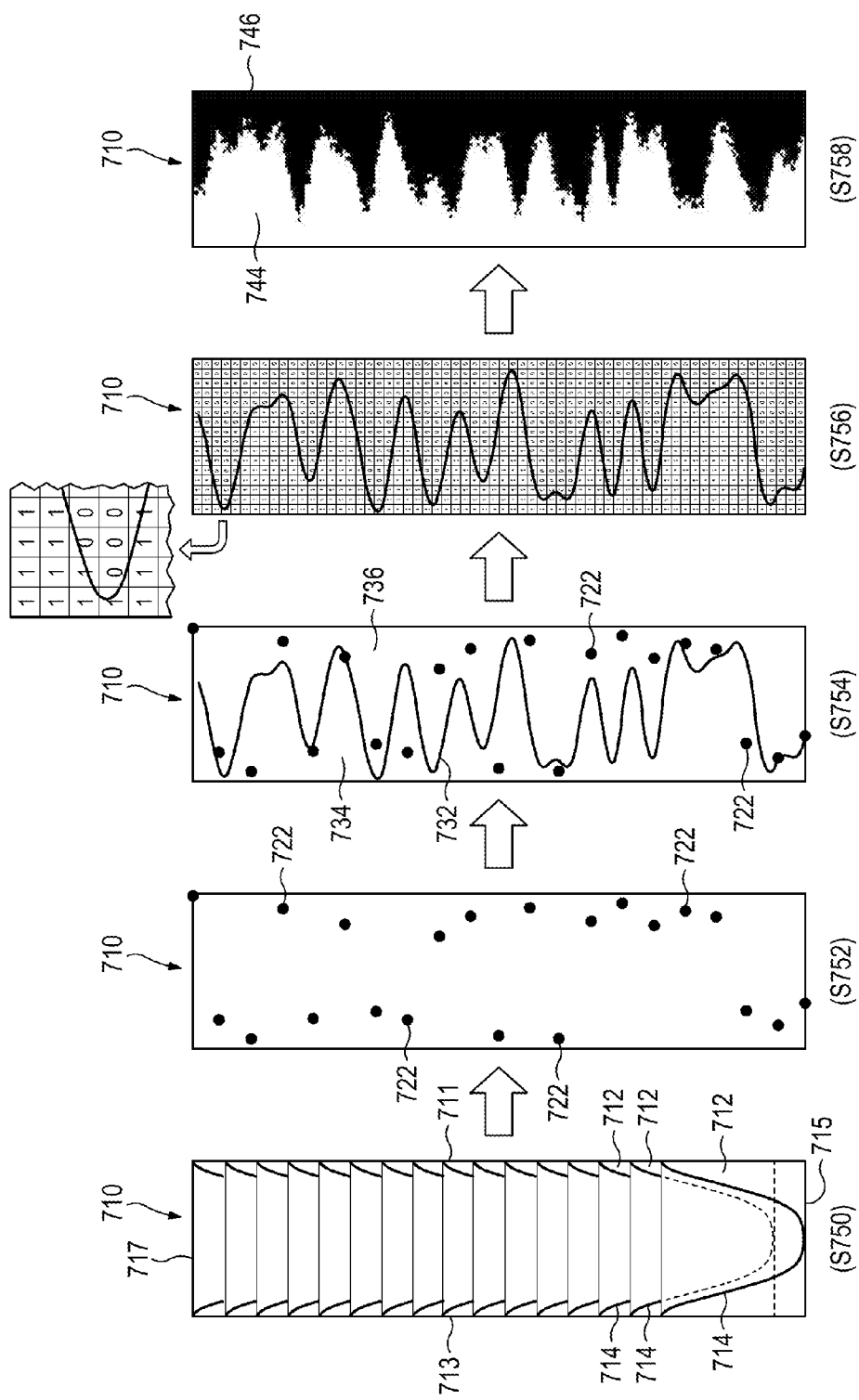
FIG. 7 illustrates example processes performed to generate a random wave mask consistent with disclosed implementations.

FIG. 7 illustrates example processes (S750, S752, S754, S756, S758) performed to generate a random wave mask consistent with disclosed implementations. Although these processes are described with reference to printing device 100 of FIG. 1 and/or specific components of printing device 100, other suitable systems and devices may be used. For example, printing device 300 and/or any other suitable system or device may be used to perform the process illustrated in FIG. 7.

As shown in FIG. 7, printing device 100 may identify a mask area 710. The mask area 710 may have edges, such as first edge 711, second edge 713, third edge 715, and fourth edge 717. In some examples, the edges may be parallel (i.e., exactly parallel or substantially parallel). For example, the first edge 711 and the second edge 713 may be parallel to each other. As another example, the third edge 715 and the fourth edge 717 may be parallel to each other, and/or perpendicular (i.e., exactly perpendicular or substantially perpendicular) to the first edge 711 and/or the second edge 713. In some examples, first edge 711 may define a first axis and second edge 713 may define a second axis. The first axis may be parallel to the first edge and the second axis may be parallel to the second edge. The first and second axes can be used to help identify the location of a particular data point. While in the example shown in FIG. 7 mask area 710 is shown as a rectangle, mask areas consistent with disclosed implementations may be any suitable size or shape.

Printing device 100 may divide (e.g., using a processor) mask area 710 into a plurality of function areas 712 using, for example, the methods described above (step S750). As shown in FIG. 7, the plurality of function areas may overlap each other (for clarity, only one area of overlap is shown in the mask area 710 associated with step S750). Printing device 100 may also generate a plurality of probability density functions 714, where each of the probability density functions 714 is associated with one of the function areas 712 and has a maximum probability density located adjacent to edges (e.g. first edge 711 and second edge 713) of the mask area. Thus, in some implementations, the probability density function may follow an inverted normal distribution having a first maximum value on first edge 711, a second maximum value on second edge 713, and a minimum value on third edge 715 of the mask area. For example, the probability density functions 714 may follow a binomial distribution in which there are two maximum probabilities at the edges of the mask area 710 (e.g., first edge 711 and second edge 713) and a minimum probability at another edge (e.g., third edge 715) of the mask area 710. In the example shown in FIG. 7, the probability density functions 714 may be positioned within each of the function areas 712.

Printing device 100 may also distribute (e.g., using a processor) at least one data point 722 in each of the function areas 712 based on the associated probability density function 714 (step S752). For example, printing device 100 may determine a location of the point within function area 712 based on a random selection of the location based on probability density function 714. For example, if a probability density function 714 follows an inverted normal distribution as shown in FIG. 7, it is more likely that the data points will be placed closer to edges 711, 713 of mask area 710, and less likely that the data points may be placed closer to a center line of the function areas 712 (i.e., a center line parallel with edges 711, 713). In some implementations, each of the probability density functions 714 may correspond to a single data point. For example, each function area 712 may include a single data point 722 that is placed in the function area based on the probability density function 714. In some examples, data point 722 may be positioned randomly along a single axis (e.g., the first axis) or multiple axes (e.g., the first axis and the third axis). Thus, in some implementations, each data point 722 may correspond with a single function area 712 and a single probability density function 714.

Printing device 100 may also identify (e.g., using a processor) a wave curve that connects the data points in each of the function areas, where the wave curve includes oscillating waveforms of varying amplitudes (step S754). In some implementations, the wave curve may be identified by using the methods discussed above, such as by creating a fifth degree b-spline. Printing device 100 may also generate (e.g., using a processor) a random wave mask based on the wave curve (step S756). For example, printing device 100 may generate the random wave mask using at least one of the processes described above, such as by dividing the mask area into a plurality of cells, assigning an indicator to each of the plurality of cells based on whether the cell is located on one side of the wave curve or the other side of the wave curve, and potentially modifying the assignment of the indicators of tapering cells based on a second probability density function. Printing device 100 may also print content (e.g., using a processor) on a print media based on the random wave mask (step S758). For example, printing device 100 and/or another device may apply the random wave mask to a plurality of droplet ejection elements to deposit printing fluid onto print media. As shown in FIG. 7, the light colored area 744 may have been deposited by a first set of droplet ejection elements, while the dark colored area 746 may have been deposited by a second set of droplet ejection elements. As shown in FIG. 7, the boundary of the wave curve has been softened or made fuzzier based on modifications to the indicators of the tapering cells in random wave masks.

It is to be understood that FIG. 7 (and similarly FIG. 8 below) are simplified illustrations. Thus, for example, random wave masks consistent with disclosed implementations may include more cells and may be based on more data points, more wave curves, and the like. As another example, masks consistent with disclosed examples may have cells of any suitable size, shape, and arrangement.

FIG. 8 illustrates an example of a portion of a random wave mask 800 consistent with disclosed implementations. In certain aspects, random wave mask 800 may correspond to at least one of the random wave masks described above and may be applied to various components described above. In some implementations, random wave mask 800 may be a weaving mask, a binary mask, a binary filter, and/or the like which instructs individual droplet ejection elements of a printhead assembly, such as printhead assembly 110, printhead assembly 210, and/or the like, to address a pixel that occurs in an image file in a defined sequence of firing. In the example shown in FIG. 8, random wave mask 800 may correspond to a mask for target pixels that are fired from a first set of droplet ejection elements (e.g., cells with an indicator of "0") and a second set of droplet ejection elements (e.g., cells with an indicator of "1"). A target pixel may be considered to be a pixel to be printed on print media that corresponds to a pixel that occurs in an image file. In some implementations, random wave mask 800 may include a number of rows and columns which define a plurality of cells 810 (for simplicity, only one column of which has been labelled in FIG. 8 as 810*a*, 810*b*, 810*c*, 810*d*, 810*e*, 810*f*, 810*g*, and 810*h*), and each cell 810 may correspond to a target pixel in an overlap area, such as the overlap areas 224A through 224G shown in FIG. 2. As shown in FIG. 8, each cell may indicate whether the target pixel will include printing fluid fired by a first set of droplet ejection elements in a first printhead die (labelled as "0") or a second set of droplet ejection elements in a second printhead die (labelled as "1"). The character "0" in a cell may indicate that at least one nozzle of printhead die 0 is fired for the target pixel, and the character "1" in a cell may indicate that at least one nozzle of printhead die 1 is fired for the target pixel. As shown in FIG. 8, the target pixels to be fired by the first set of droplet ejection elements may meet the target pixels to be fired by the second set of droplet ejection elements at or near wave curve 832.

Figure 9:
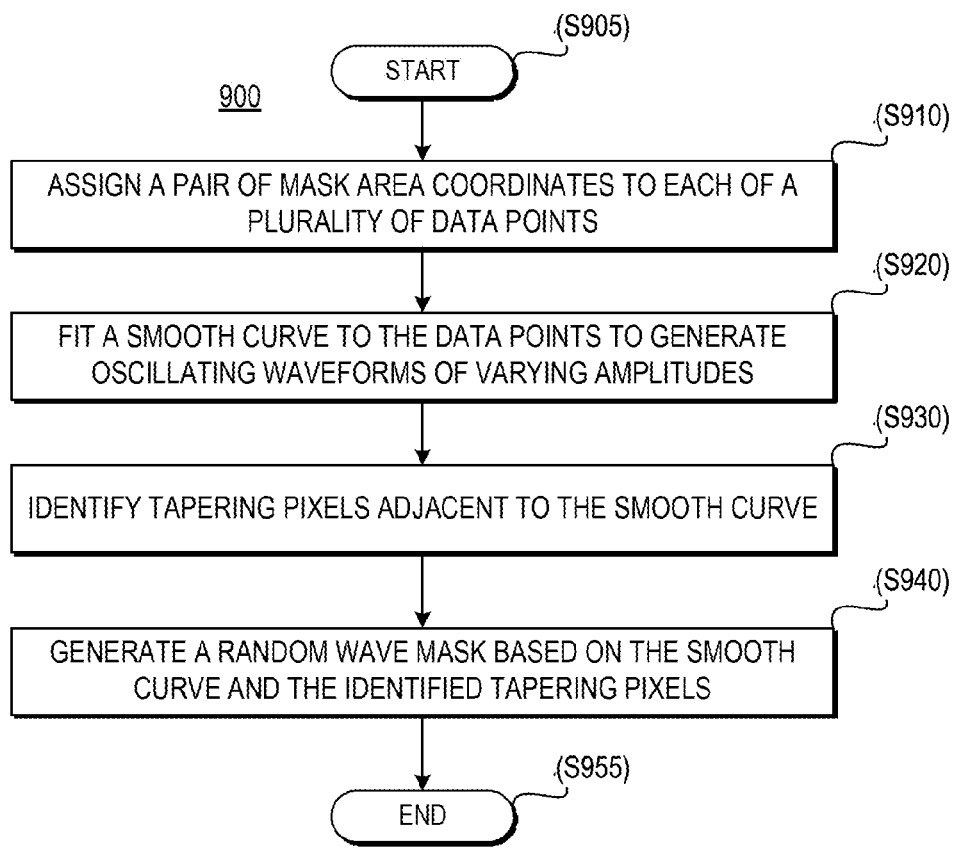
FIG. 9 is a flow chart of an example process for generating a random wave mask consistent with disclosed implementations.

FIG. 9 is a flow chart of an example process 900 for generating a random wave mask consistent with disclosed implementations. Although execution of process 900 is described below with reference to printing device 100 of FIG. 1 and/or specific components of printing device 100, other suitable systems and devices for execution of at least one step of process 900 may be used. For example, processes described below as being performed by printing device 100 may be performed by printing device 300 and/or any other suitable device. Process 900 may be implemented in the form of executable instructions stored on a storage device, such as a non-transitory machine-readable storage medium, and/or in the form of electronic circuitry.

Process 900 may start (step S905) and may include a number of steps that are the same as or similar to the steps performed above. In some implementations, process 900 may include assigning a pair of mask area coordinates to each of a plurality of data points, a first coordinate pair of the mask area coordinates being based on a probability density function (step S910). In some implementations, the pair of mask area coordinates may be assigned using the methods discussed above. For example, the mask area coordinates may be assigned by: dividing a mask area into a plurality of function areas; generating at least one probability density function; and distributing at least one data point in each of the function areas based on its associated probability density function. Process 900 may also include fitting a smooth curve to the data points to generate oscillating waveforms of varying amplitudes (step S920). For example, as discussed above, the smooth curve may be fit by generating a fifth degree b-spline. Process 900 may also identifying tapering cells adjacent to the smooth curve (step S930) and generating a random wave mask based on the smooth curve and the identified tapering pixels (step S940). For example, as discussed above, printing device 100 may identify tapering cells based on proximity to the wave curve and determine whether to modify the indicator associated with those cells based on a second probability density function. The tapering cells adjacent to the smooth curve may comprise a predetermined number of cells adjacent to the wave curve, and the wave mask is generated by determining whether to switch the initial assignment of at least one tapering cell from a first set of droplet ejection elements to a second set of droplet ejection elements, the determination being based on a proximity of the tapering cell to the smooth curve. In some implementations, the closer the tapering cell is to the wave curve, the higher the probability of switching the initial assignment. Once at least one of processes 910, 920, 930, and 940 has been performed, process 900 may end (step S955)

The disclosed examples may include systems, devices, computer-readable storage media, and methods for random wave mask generation. For purposes of explanation, certain examples are described with reference to the components illustrated and/or described in FIGS. 1-9. The functionality of these components may overlap, however, and may be present in a fewer or greater number of elements and components. Further, all or part of the functionality of illustrated elements may co-exist or be distributed among several geographically dispersed locations. Moreover, the disclosed examples may be implemented in various environments and are not limited to the illustrated examples.

Moreover, as used in the specification and the appended claims, the singular forms "a," "an," and "the" are intended to include the plural forms as well, unless the context indicates otherwise. Additionally, although the terms first, second, etc. may be used herein to describe various elements, these elements should not be limited by this terms. Instead, these terms are used to distinguish one element from another.

Further, the sequence of operations described in connection with FIGS. 1-9 are examples and are not intended to be limiting. Additional or fewer operations or combinations of operations may be used or may vary without departing from the scope of the disclosed examples. Thus, the present disclosure merely sets forth possible examples of implementations, and many variations and modifications may be made to the described examples. All such modifications and variations are intended to be included within the scope of this disclosure and protected by the following claims.

We claim:

1. A device for random wave mask generation comprising:
   a data point distribution engine to distribute data points in a mask area based on a probability density function, the probability density function having a maximum probability density located at a first edge and a second edge of the mask area;
   a wave curve identification engine to identify a wave curve that fits the data points, the wave curve including oscillating waveforms of varying amplitudes; and
   a random wave mask generation engine to generate a random wave mask based on the wave curve.

2. The device of claim 1, wherein distributing the data points in the mask area comprises:
   identifying a first axis range for each of the data points along a first axis of the mask area; and
   identifying a set of mask area coordinates for each of the data points by applying the probability density function, the probability density function being applied based on the first axis position.

3. The device of claim 2, wherein:
   the first axis is parallel to the first edge; and
   the first axis position is based on a length of the first edge and a first axis interval between each of the data points.

4. The device of claim 1, wherein identifying the wave curve that fits the data points includes fitting a smooth curve that approximates the data points to generate the oscillating waveforms.

5. The device of claim 4, wherein fitting the smooth curve comprises creating a fifth degree b-spline based on the data points.

6. The device of claim 1, wherein:
   the probability density function follows an inverted normal distribution having a first maximum value on the first edge, a second maximum value on the second edge, and a minimum value on a third edge of the mask area.

7. The device of claim 1, wherein:
   the mask area includes a plurality of cells;
   the wave curve divides the mask area into a first mask area and a second mask area; and
   generating the random wave mask comprises assigning an indicator to each of the plurality of cells, the indicator being one of a first indicator and a second indicator, the first indicator being assigned to cells of the plurality of cells that correspond to the first mask area, and the second indicator being assigned to cells of the plurality of cells that correspond to the second mask area.

8. The device of claim 7, wherein:

the probability density function is a first probability density function;

a number of the plurality of cells adjacent to the wave curve are tapering cells;

generating the random wave mask comprises determining whether to modify the assignment of the indicator of each of the tapering cells based on a second probability density function.

9. A non-transitory machine-readable storage medium including instructions that, when executed by a processor, cause the processor to:

assign a set of mask area coordinates to each of a plurality of data points, a first coordinate of the set of mask area coordinates being assigned based on a probability density function;

fit a smooth curve to the data points to generate oscillating waveforms of varying amplitudes;

identify tapering cells adjacent to the smooth curve; and generate a random wave mask based on the smooth curve and the identified tapering cells.

10. The non-transitory machine-readable storage medium of claim 9, wherein the tapering cells adjacent to the smooth curve comprise a number of cells adjacent to the wave curve.

11. The non-transitory machine-readable storage medium of claim 9, wherein:

the random wave mask is generated by determining whether to switch the initial assignment of at least one of the tapering cells from a first set of droplet ejection elements to a second set of droplet ejection elements, the determination being based on a proximity of the at least one of the tapering cells to the smooth curve.

12. The non-transitory machine-readable storage medium of claim 11, wherein the closer the tapering cell is to the wave curve, the higher the probability of switching the initial assignment.

13. A machine-implemented method for random wave mask generation comprising:

dividing, using a processor, a mask area into a plurality of function areas;

generating, using the processor, at least one probability density function, each of the at least one probability density function being associated with at least one of the function areas and having a maximum probability density located adjacent to edges of the mask area;

distributing, using the processor, at least one data point in each of the function areas based on the associated probability density function;

identifying, using the processor, a wave curve that connects the at least one data point in each of the function areas, the wave curve including oscillating waveforms of varying amplitudes;

generating, using the processor, a random wave mask based on the wave curve; and printing content, using the processor, on a print media based on the random wave mask.

14. The computer-implemented method of claim 13, wherein the edges of the mask area are parallel.

15. The computer-implemented method of claim 13, wherein printing the content on the print media using the random wave mask includes applying the random wave mask to a plurality of droplet ejection elements.

* * * * *

UNITED STATES PATENT AND TRADEMARK OFFICE
CERTIFICATE OF CORRECTION

PATENT NO. : 10,000,080 B2
APPLICATION NO. : 15/547729
DATED : June 19, 2018
INVENTOR(S) : Xavier Farina Vargas et al.

Page 1 of 1

It is certified that error appears in the above-identified patent and that said Letters Patent is hereby corrected as shown below:

In the Drawings

In sheet 1 of 7, FIG. 1, reference numeral 120, Line 2, delete "ASSMEBLY" and insert -- ASSEMBLY --, therefor.

Signed and Sealed this
Fourth Day of December, 2018

Andrei Iancu
*Director of the United States Patent and Trademark Office*